US010126676B2

(12) United States Patent
Seki

(10) Patent No.: US 10,126,676 B2
(45) Date of Patent: Nov. 13, 2018

(54) IMAGE FORMING APPARATUS

(71) Applicant: CANON KABUSHIKI KAISHA, Tokyo (JP)

(72) Inventor: Yuichi Seki, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/646,996

(22) Filed: Jul. 11, 2017

(65) Prior Publication Data

US 2018/0017889 A1  Jan. 18, 2018

(30) Foreign Application Priority Data

Jul. 13, 2016  (JP) ................. 2016-138750

(51) Int. Cl.
| | |
|---|---|
| G03G 15/043 | (2006.01) |
| H04N 1/00 | (2006.01) |
| H04N 1/393 | (2006.01) |
| H04N 1/113 | (2006.01) |
| H04N 1/40 | (2006.01) |

(52) U.S. Cl.
CPC ....... *G03G 15/043* (2013.01); *H04N 1/00037* (2013.01); *H04N 1/00058* (2013.01); *H04N 1/00082* (2013.01); *H04N 1/113* (2013.01); *H04N 1/393* (2013.01); *H04N 1/40056* (2013.01)

(58) Field of Classification Search
CPC ............. G03G 15/043; H04N 1/40056; H04N 1/00082; H04N 1/00058; H04N 1/113; H04N 1/393; H04N 1/00037
See application file for complete search history.

(56) References Cited

U.S. PATENT DOCUMENTS

| | | | | |
|---|---|---|---|---|
| 2012/0120177 A1* | 5/2012 | Seki | ................. | B41J 2/471 |
| | | | | 347/224 |
| 2012/0268723 A1* | 10/2012 | Seki | ................. | G03G 15/043 |
| | | | | 355/67 |
| 2013/0286133 A1* | 10/2013 | Furuta | ................. | G03G 15/043 |
| | | | | 347/118 |
| 2013/0286134 A1* | 10/2013 | Yamazaki | ................. | G03G 15/043 |
| | | | | 347/118 |
| 2014/0347430 A1* | 11/2014 | Maeda | ................. | G03G 15/043 |
| | | | | 347/118 |
| 2015/0002600 A1* | 1/2015 | Seki | ................. | G03G 15/04072 |
| | | | | 347/134 |
| 2015/0346484 A1* | 12/2015 | Suzuki | ................. | G02B 26/12 |
| | | | | 347/118 |
| 2017/0139342 A1* | 5/2017 | Seki | ................. | G03G 15/043 |
| 2017/0357174 A1* | 12/2017 | Seki | ................. | G03G 15/043 |

FOREIGN PATENT DOCUMENTS

| | | |
|---|---|---|
| JP | 2007-78723 A | 3/2007 |
| JP | 2011-148142 A | 8/2011 |

\* cited by examiner

*Primary Examiner* — G. M. Hyder
(74) *Attorney, Agent, or Firm* — Canon USA, Inc., IP Division

(57) ABSTRACT

Surface identification processing is performed using a period of a BD signal when an amount of light incident on a BD sensor reaches an amount equal to or more than a threshold value, and the surface identification processing is not performed using the period of the BD signal in a state where the amount of light incident on the BD sensor is less than the threshold value. Thus, malfunction of the image forming apparatus due to failure of the surface identification processing is suppressed.

10 Claims, 12 Drawing Sheets

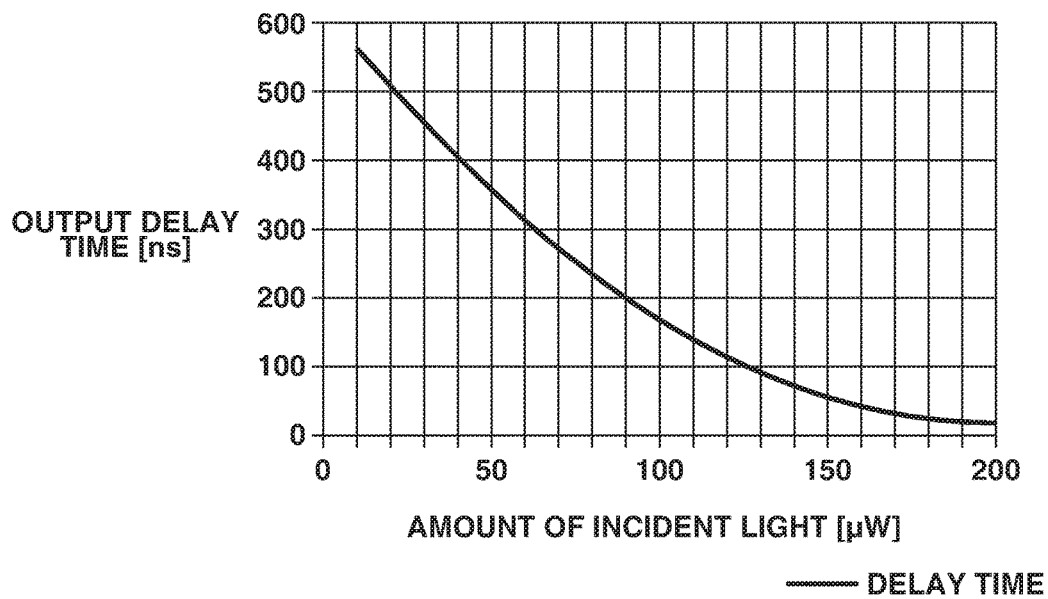
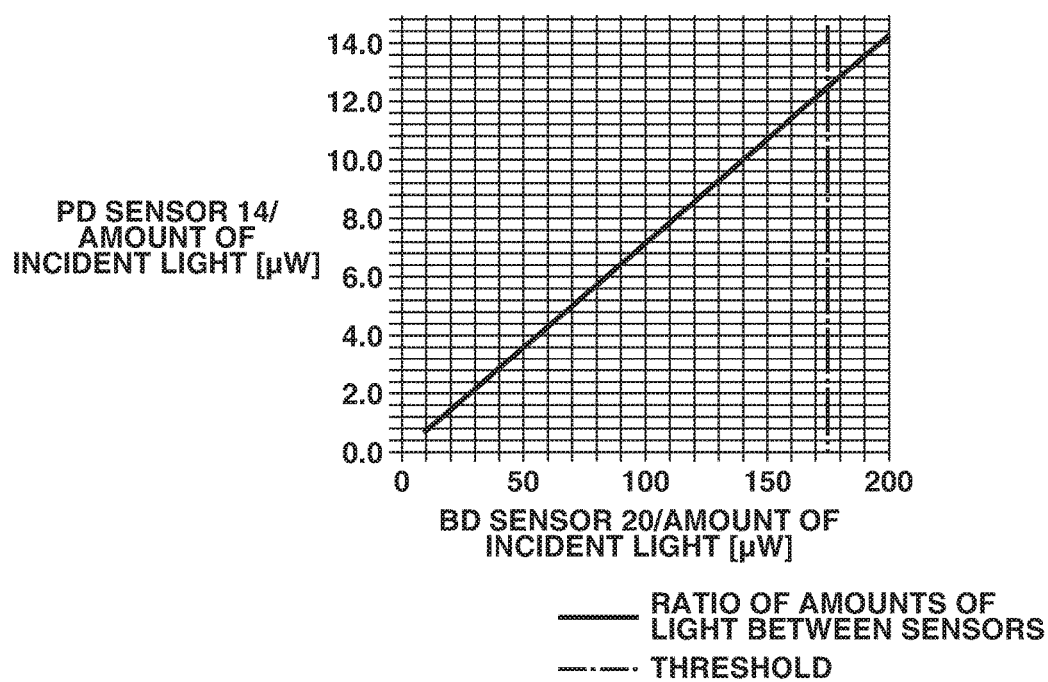

FIG.11A

| REFLECTIVE SURFACE | BD-FG PHASE DIFFERENCE |
|---|---|
| SURFACE A | 1009 |
| SURFACE B | 1676 |
| SURFACE C | FFFF |
| SURFACE D | 385 |
| SURFACE E | 9BC |

FIG.11B

| REFLECTIVE SURFACE | BD-FG PHASE DIFFERENCE | |
|---|---|---|
| | RISING EDGE | FALLING EDGE |
| SURFACE A | m + 1 | 9BC |
| SURFACE B | FFFF | 1009 |
| SURFACE C | 394 | 1676 |
| SURFACE D | 1018 | FFFF |
| SURFACE E | 1685 | 385 |

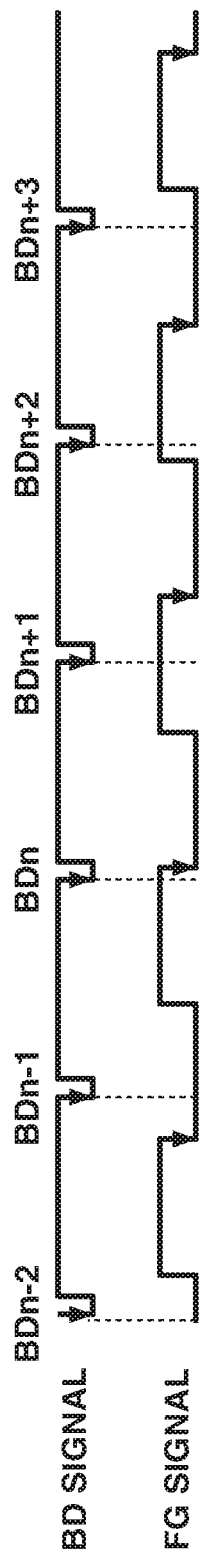

IMAGE FORMING APPARATUS

BACKGROUND OF THE INVENTION

Field of the Invention

The present invention relates to an image forming apparatus including a rotating polygon mirror that deflects laser beams.

Description of the Related Art

A conventional image forming apparatus includes an optical scanning device. The optical scanning device includes a semiconductor laser and a rotating polygon mirror. The rotating polygon mirror has a plurality of reflective surfaces. The plurality of reflective surfaces of the rotating polygon mirror deflects a laser beam emitted from the semiconductor laser. The laser beams obtained by deflection by the respective reflective surfaces of the rotating polygon mirror scan over a photosensitive drum.

It is difficult to make the rotating polygon mirror into perfect regular polygon due to errors in machining accuracy. Therefore, the exposure position of the deflected laser beams slightly varies depending on the reflective surfaces, which leads to deterioration of image quality.

Japanese Patent Application Laid-Open No. 2011-148142 and Japanese Patent Application Laid-Open No. 2007-78723 discuss an image forming apparatus having a configuration that identifies a rotational phase of a rotating polygon mirror with respect to the incident optical paths of the laser beams that are incident on the rotating polygon mirror (hereinafter referred to as surface identification) in order to electrically correct deterioration in image quality due to errors in machining accuracy of a rotating polygon mirror. Japanese Patent Application Laid-Open No. 2011-148142 discusses an image forming apparatus that performs surface identification using a period of a beam detection signal (BD signal) generated by a light-sensitive element that receives laser beams obtained by deflection by a rotating polygon mirror. Japanese Patent Application Laid-Open No. 2007-78723 discusses an image forming apparatus that performs surface identification using the phase relationship between a frequency generation signal (FG signal) and a BD signal generated based on change in the magnetic flux caused by rotation of a permanent magnet attached to a rotor of a motor for rotating a rotating polygon mirror.

In any of the above-described methods, a BD signal is used for surface identification. Thus, accurate detection of timing of rise and fall of pulses of the BD signal is necessary. A light-sensitive element such as a photodiode is used to generate a BD signal. Such a light-sensitive element outputs a signal after a certain delay time since receiving light. The delay time of the signal to be output changes depending on the amount of light received by the light-sensitive element. Generally, the delay time is stabilized when the amount of light that is incident on the light-sensitive element reaches a predetermined value or more. On the other hand, when the amount of light is less than the predetermined value, the delay time changes depending on the amount of light and the delay amount increases as the amount of light decreases.

The amount of light that is incident on the light-sensitive element is controlled to be a target amount of light, but the amount of light varies slightly in respective scanning cycles. Therefore, when an image forming apparatus performs surface identification using a BD signal generated with the amount of light equal to or less than the predetermined value, the image forming apparatus may make an error in the surface identification.

SUMMARY OF THE INVENTION

According to an aspect of the present invention, an image forming apparatus includes a light source configured to emit a light beam having an amount of light corresponding to a value of supplied current, a detection unit including a first light-sensitive element on which a light beam emitted from the light source is incident and configured to output a voltage corresponding to an amount of light that is incident on the first light-sensitive element, a rotating polygon mirror including a plurality of reflecting surfaces and configured to deflect a light beam emitted from the light source by the plurality of reflecting surfaces so that the light beam emitted from the light source scans over a photosensitive member, a second light-sensitive element configured to generate a periodic signal having a period corresponding to a rotation speed of the rotating polygon mirror by incidence of the light beam obtained by deflection by each reflective surface, a light amount control unit configured to control a value of current to be supplied to the light source based on the voltage output from the detection unit so that an amount of light of a light beam that is incident on the second light-sensitive element becomes a target amount of light, a voltage output unit configured to output a predetermined threshold voltage corresponding to an amount of light lower than the target amount of light, and an identification unit configured to perform identification processing for identifying a reflecting surface on which the light beam is incident from the plurality of reflecting surfaces using the period of the periodic signal, wherein the identification unit performs the identification processing when the voltage output from the detection unit is equal to or higher than the predetermined threshold voltage and does not perform the identification processing when the voltage output by the detection unit is lower than the predetermined threshold voltage.

According to an aspect of the present invention, an image forming apparatus includes a light source configured to emit a light beam having an amount of light corresponding to a value of supplied current, a detection unit including a first light-sensitive element on which a light beam emitted from the light source is incident and configured to output a voltage corresponding to an amount of light that is incident on the first light-sensitive element, a rotating polygon mirror including a plurality of reflecting surfaces and configured to deflect the light beam emitted from the light source by the plurality of reflecting surfaces so that the light beam emitted from the light source scans over a photosensitive member, a deflection device including a drive motor including a rotor configured to rotate the polygon mirror and a permanent magnet fixed to the rotor, a circuit board on which the drive motor is mounted, and a hall element mounted on the circuit board, configured to detect change in magnetic flux caused by rotation of the rotor of the drive motor, and output a hall element signal based on the detection result, a second light-sensitive element configured to generate a periodic signal having a period corresponding to a rotation speed of the rotating polygon mirror by incidence of light beams obtained by deflection by the respective reflective surfaces, a light amount control unit configured to control a value of current to be supplied to the light source based on the voltage output by the detection unit so that an amount of light of a light beam that is incident on the second light-sensitive element becomes a target amount of light, a voltage output unit configured to output a predetermined threshold voltage corresponding to an amount of light lower than the target amount of light, and an identification unit configured to perform identification processing for identifying a reflecting surface on which the light beam is incident from the plurality of reflecting surfaces using the period of the periodic signal, wherein the identification unit performs the identification processing when the voltage output from the detection unit is equal to or higher than the predetermined threshold voltage, and does not perform the identification processing when the voltage output by the detection unit is lower than the predetermined threshold voltage.

Further features of the present invention will become apparent from the following description of exemplary embodiments with reference to the attached drawings.

BRIEF DESCRIPTION OF THE DRAWINGS

FIG. 4A illustrates an amount of light that is incident on a BD sensor and an output delay time of a BD signal, and FIG. 4B illustrates a relationship between the amount of light that is incident on the BD sensor and an amount of light that is incident on a PD.

FIGS. 11A and 11B are diagrams illustrating BD-FG phase difference data.

FIG. 12 is a timing chart illustrating a relationship between the FG signal and the BD signal.

DESCRIPTION OF THE EMBODIMENTS

<Overall Configuration of Image Forming Apparatus>

Figure 1:
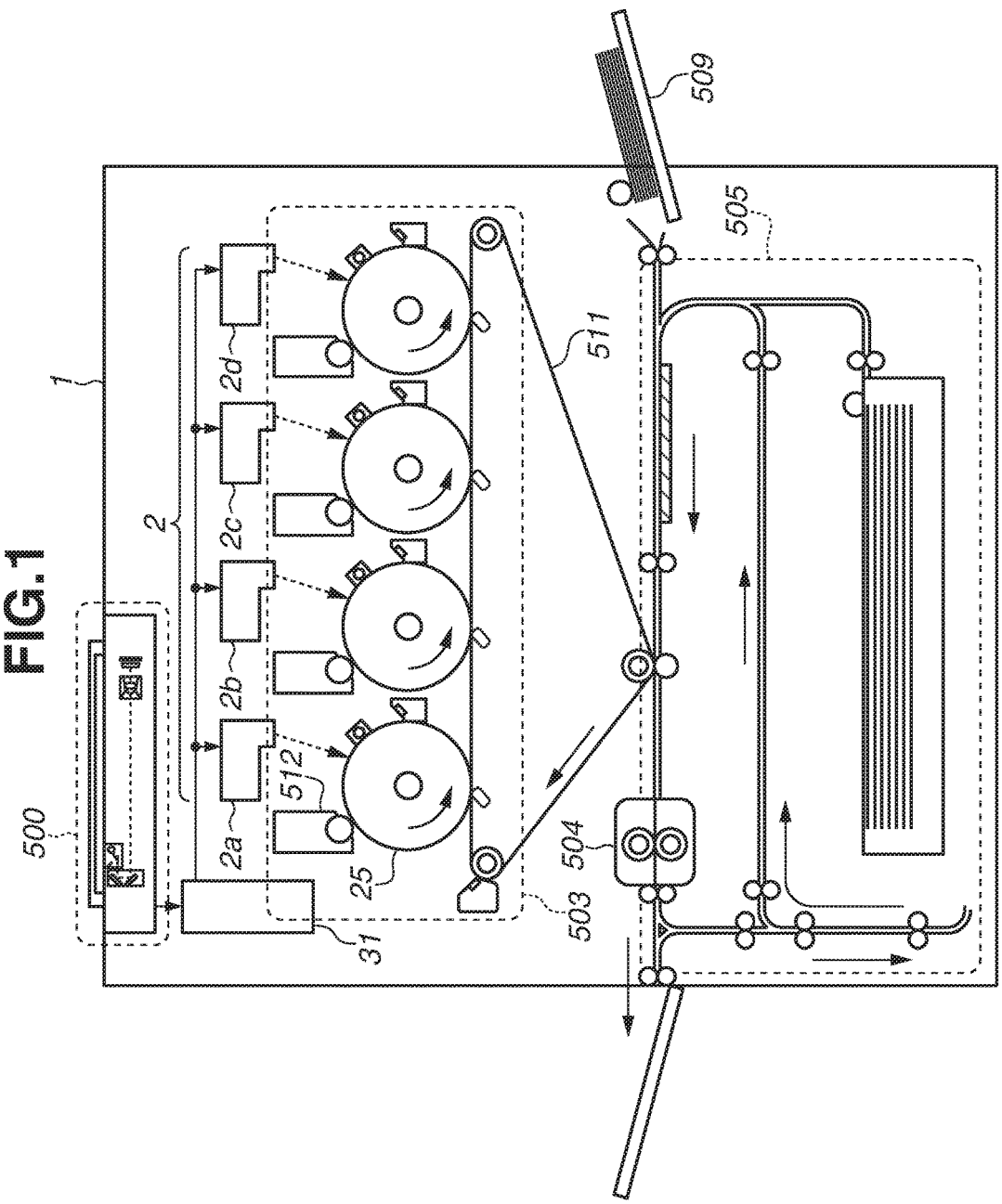
FIG. 1 is a schematic sectional view of an image forming apparatus.

An electrophotographic image forming apparatus 1 will be briefly described. FIG. 1 illustrates an overall configuration of an image forming apparatus 1. The image forming apparatus 1 includes optical scanning devices 2 (2a, 2b, 2c, and 2d), a control unit 31, a reader scanner unit 500, an image forming unit 503 including photosensitive drums 25 as a photosensitive member, a fixing unit 504, a sheet feeding/conveyance unit 505. The reader scanner unit 500 optically reads an original image by illuminating a document placed on a document positioning plate, and then converts the image into an electrical signal to generate image data. The optical scanning devices 2 (2a, 2b, 2c, and 2d) emit light according to the image data and the photosensitive drums 25 are irradiated with the light. The control unit 31 controls light emission of the optical scanning devices 2 (2a, 2b, 2c, 2d) and generates image data. The image forming unit 503 rotationally drives the photosensitive drums 25 and electrostatically charges each photosensitive drum 25 using an electric charger, and develops the latent image formed on the photosensitive drums 25 by the optical scanning devices 2 (2a, 2b, 2c, and 2d) to a visible image with toner. Four development units 512 (development stations) perform a series of electrophotographic processes including transferring the toner image onto an intermediate transfer member 511 provided in the image forming unit 503, and collecting minute toner remaining on the photosensitive drum that has not been transferred at that time. The image forming unit 503 is realized by including the four development units 512. The four development units arranged in the order of yellow (Y), magenta (M), cyan (C), and black (K) sequentially perform image formation operation of magenta, cyan, and black after a lapse of a predetermined time from the start of image formation of the yellow station. By this timing control, a full-color toner image without color misregistration is transferred onto the intermediate transfer member 511. The toner image formed on the intermediate transfer member 511 is transferred onto the sheet. The fixing unit 504 is constituted by a combination of rollers and a belt, incorporates a heat source such as a halogen heater, and melts and fixes the toner on the sheet to which the toner image has been transferred from the intermediate transfer member 511 by heat and pressure.

<Optical Scanning Device>

Figure 2:
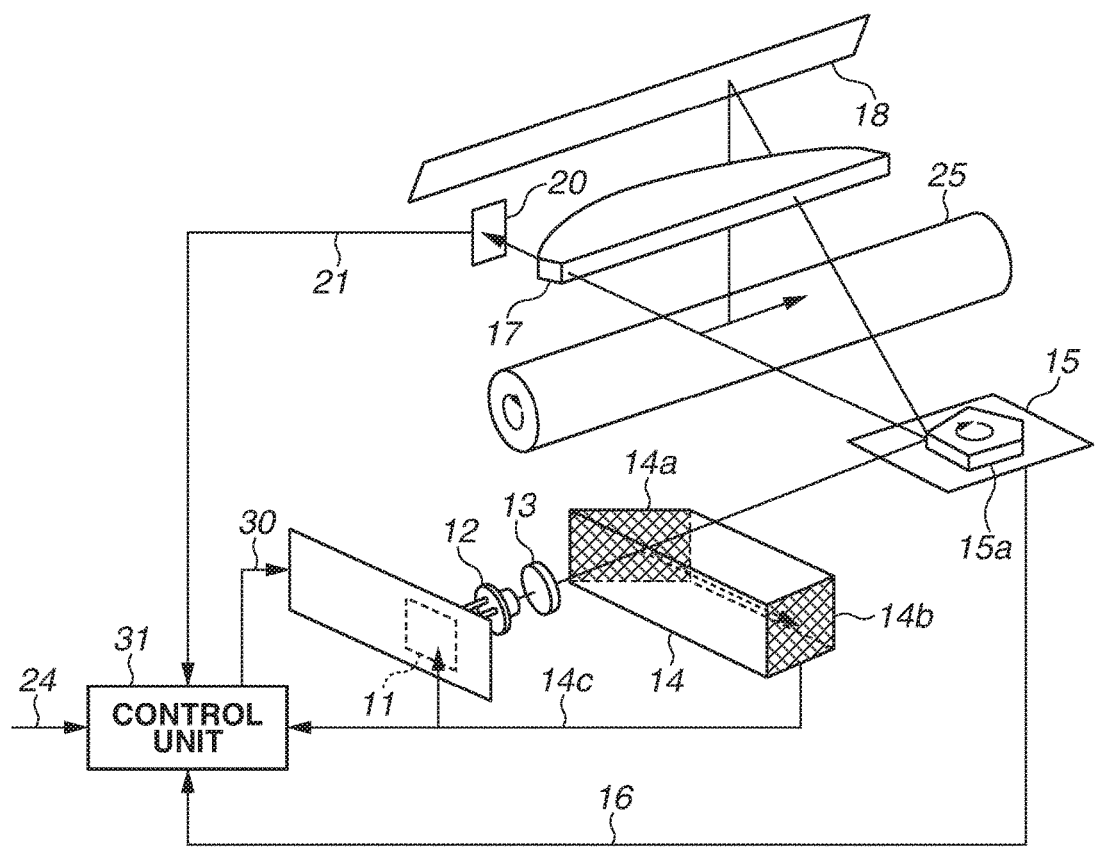
FIG. 2 is a schematic diagram of an optical scanning device.

FIG. 2 is an extracted configuration diagram of the optical scanning device 2. In a non-image-forming area, a laser beam (light beam) emitted from a semiconductor laser 12 (light source) passes through a collimator lens 13 and a light amount detection unit (hereinafter abbreviated as PD unit) 14, and then is incident on a rotating polygon mirror 15a (hereinafter referred to as a polygon mirror).

The polygon mirror 15a includes a plurality of reflective surfaces. The polygon mirror 15a of the present exemplary embodiment has five surfaces. The polygon mirror 15a is rotationally driven by a drive motor 700 to be described below. Each reflective surface of the polygon mirror deflects the laser beam so that the laser beam having been emitted from the semiconductor laser 12 scans over the photosensitive drum 25.

As illustrated in FIG. 2, the laser beam having been deflected by the polygon mirror 15a passes through an f-θ lens 17 and is incident on a beam detection sensor 20 (hereinafter abbreviated as BD sensor). The BD sensor 20 (second light-sensitive element) outputs a beam detection signal 21 (hereinafter abbreviated as a BD signal) which is a periodic signal having a period corresponding to the rotation speed of the polygon mirror 15a by being scanned with the laser beam. The BD signal 21 is a signal serving as a reference of the emission timing of the laser beam based on the image data in order to match the start of writing position of the image in the scanning direction of the laser beam.

Further, as illustrated in FIG. 2, the laser beam having been deflected by the polygon mirror 15a scans over the photosensitive drum 25. The laser beam is guided onto the photosensitive drum 25 by the f-θ lens and a reflection mirror 18. An electrostatic latent image is formed on the photosensitive drum 25 by the scanning with the laser beam.

The PD unit 14 includes a reflection mirror 14a inside thereof and a photodiode 14b (hereinafter referred to as PD 14b) on the output surface of the laser beam. The reflection mirror 14a is a beam separating unit that separates a laser beam having been emitted from the semiconductor laser 12 and passed through the collimator lens 13 into a laser beam to be transmitted and a laser beam to be reflected. On the PD 14b, the laser beam having been reflected by the reflection mirror 14a is incident. The PD 14b outputs a PD signal 14c having a voltage corresponding to the incident laser beam. In addition, the PD may be incorporated in the semiconductor laser 12.

<Drive Motor>

Figure 7A:
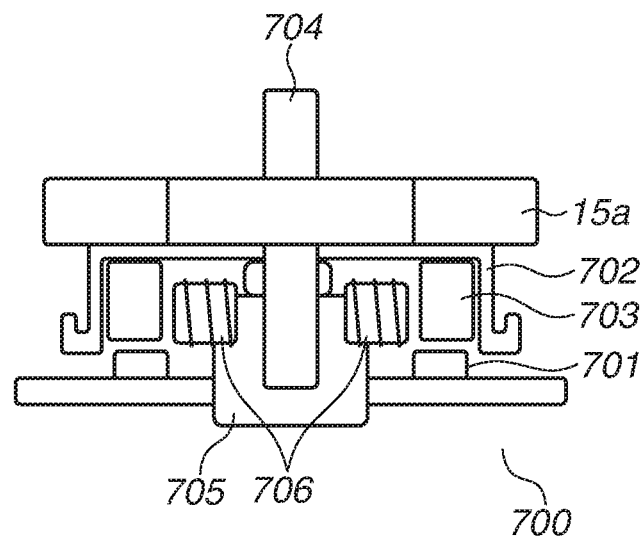
FIGS. 7A and 7B are schematic diagrams of a drive motor.

FIG. 7A is a sectional view of the drive motor 700 and the polygon mirror 15a fixed thereto. The drive motor 700 includes a rotor 702, a permanent magnet 703, a rotating shaft 704, a stator 705, and coils 706. The drive motor 700 is fixed to a circuit board 15. The plurality of coils 706 is fixed to the stator 705 of the drive motor 700. The rotating shaft 704 is rotationally supported by a bearing provided in the stator 705 and rotates in the bearing. The rotor 702 is fixed to the rotating shaft 704. The permanent magnet 703 is fixed to the rotor 702. The polygon mirror 15a is assembled to the rotor 702 at the time of assembling the optical scanning device. The polygon mirror 15a is pressed against the rotor 702 by a pressing member (not illustrated).

Figure 7B:
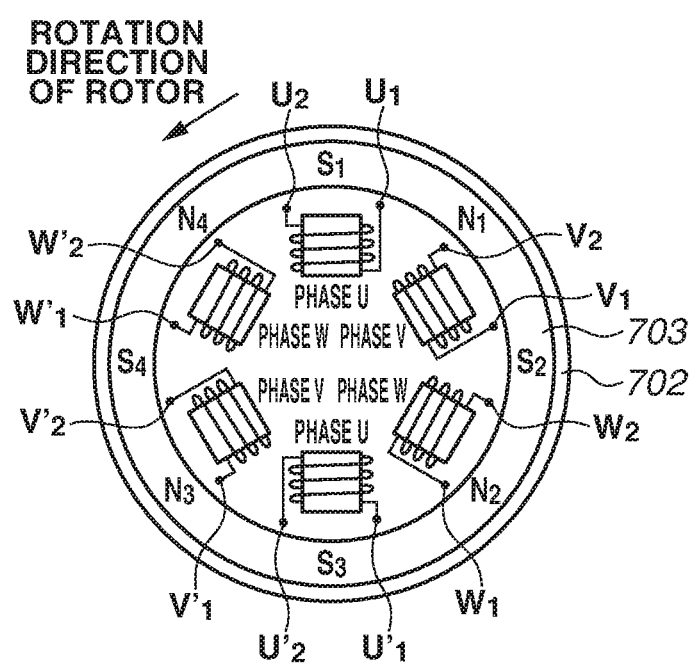

FIG. 7B is a diagram of the drive motor 700 illustrated in FIG. 7A viewed from the upper side of the rotating shaft direction, and includes the rotor 702, the permanent magnet 703, and the coils 706. The rotor 702 rotates in the direction of the arrow. As illustrated in FIG. 7B, the permanent magnet 703 is magnetized to have S poles and N poles alternately along the rotation direction of the rotor 702. The permanent magnet 703 in FIG. 7B is an example having four pairs of the S pole and the N pole, but the cycle of the magnetization patterns is not limited thereto. The permanent magnet 703 is designed in such a manner that the number of pulses of the BD signal 21 and the number of pulses of an FG signal 16 generated while the polygon mirror 15a makes one rotation (one revolution) are mutually prime. The reason for this is to avoid a situation that the reflective surface of the polygon mirror 15a cannot be uniquely identified when the permanent magnet 703 is designed in such a manner that the number of pulses of the BD signal 21 and the number of pulses of the FG signal 16 are not mutually prime.

By controlling the timings at which the current is supplied to the plurality of coils 706, the rotor 702 and the permanent magnet 703 are rotated in the direction of the arrow about the rotating shaft 704 by the magnetic force acting between the plurality of coils 706 and the permanent magnet 703.

Figure 10:
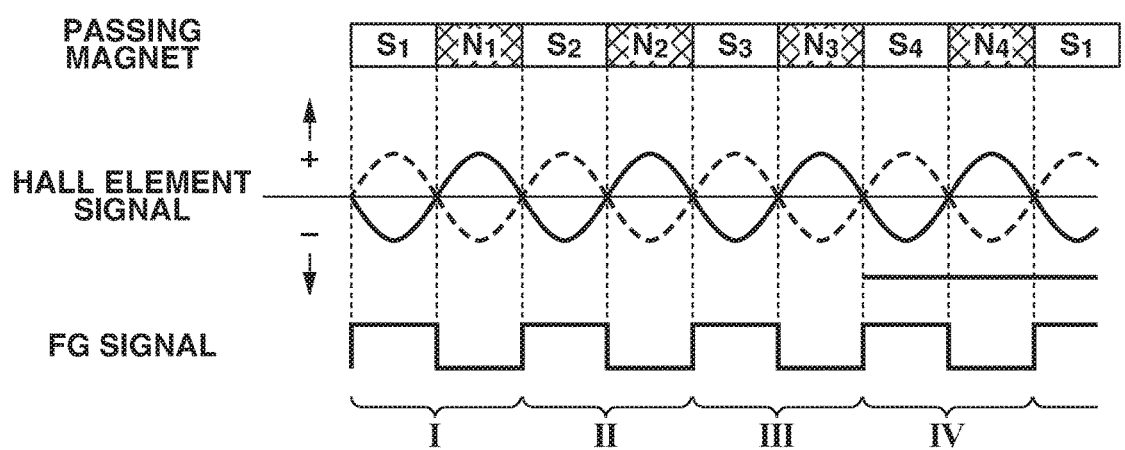
FIG. 10 is a timing chart illustrating a relationship between a hall element signal and an FG signal.

A hall element 701 is mounted on the circuit board 15. The hall element 701 is an element that detects changes in magnetic flux generated by rotation of the permanent magnet 703 and outputs the changes in magnetic flux as a hall element signal. FIG. 10 illustrates an output waveform of the hall element 701 and a pulse waveform of the FG signal 16 to be described below. As illustrated in FIG. 10, the permanent magnet 703 passes the vicinity of the hall element 701 in the order of S1→N1→S2→N2→ . . . . As the S poles and the N poles pass alternately, the hall element 701 outputs a plurality of sinusoidal hall element signals having different phases by 180 degrees indicating a change in magnetic flux. A waveform generating circuit 802 to be described below generates a pulsed FG signal 16 (described below) based on the intersection of the plurality of sinusoidal hall element signals.

When assembling the polygon mirror 15a to the drive motor 700, a worker fixes the polygon mirror 15a to the rotor 702 without grasping the positional relationship between the position of the reflective surfaces of the polygon mirror 15a and the magnetized pattern.

<Control Block Diagram>

Figure 8:
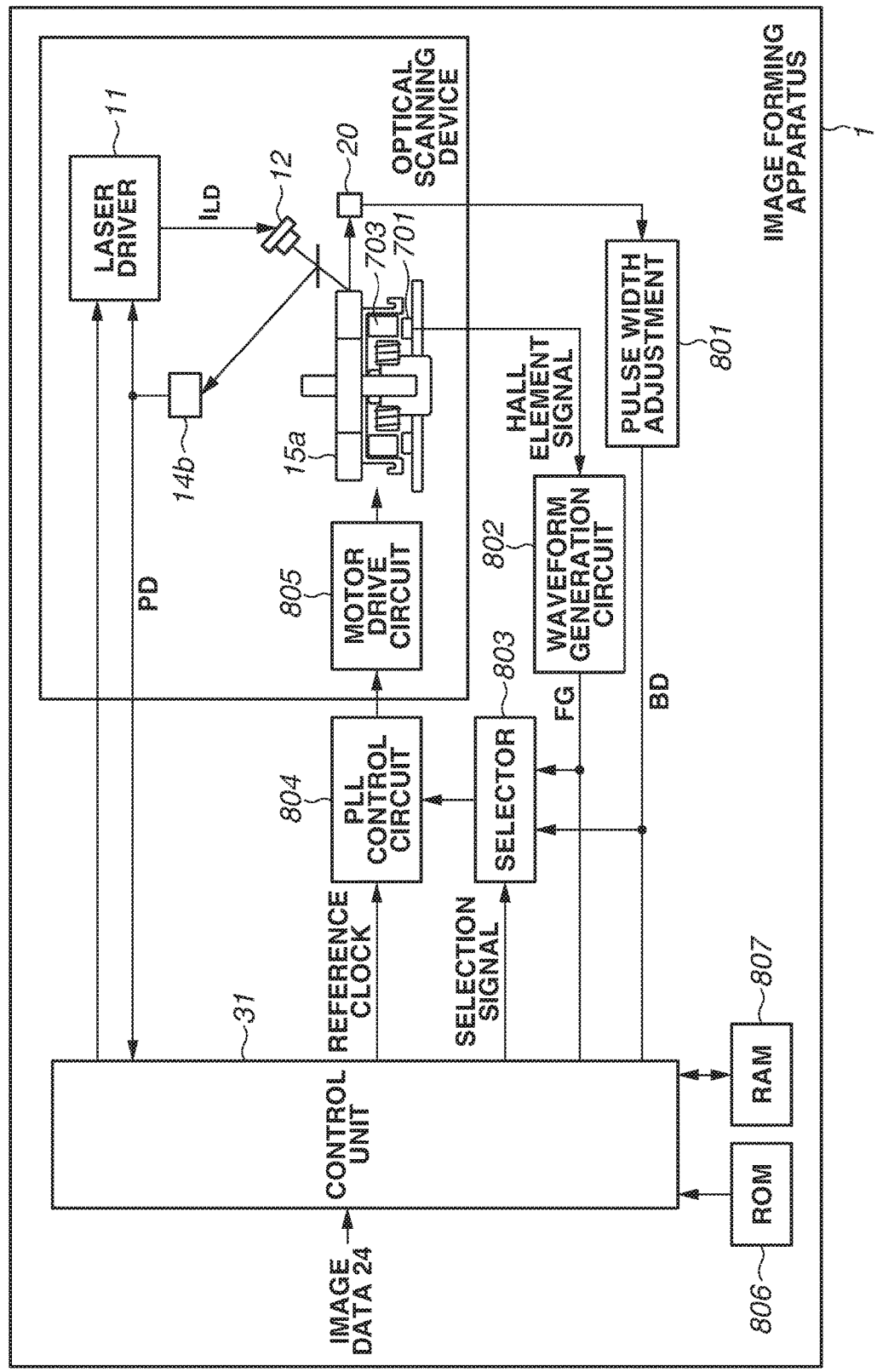
FIG. 8 is a control block diagram of the drive motor.

FIG. 8 is a control block diagram for controlling the drive motor 700 of the image forming apparatus 1. The control unit 31 outputs to a selector 803 a selection signal causing the FG signal 16 to be input from the selector 803 to a phase locked loop (PLL) control circuit 804. The selector 803 inputs the FG signal 16 to the PLL control circuit 804 according to the selection signal and does not input the BD signal 21 to the PLL control circuit 804. The control unit 31 also outputs a reference CLK corresponding to the FG signal 16 to the PLL control circuit 804. The reference clock corresponding to the FG signal 16 is a periodic signal having a period corresponding to the target rotation number of the polygon mirror 15a. The PLL control circuit 804 transmits an acceleration signal and a deceleration signal to a motor drive circuit 805 so that the period of the FG signal 16 input to the PLL control circuit 804 matches the period of the reference clock.

On the other hand, the control unit 31 outputs to the selector 803 a selection signal that causes the BD signal 21 to be input from the selector 803 to the PLL control circuit 804. The selector 803 inputs the BD signal 21 to the PLL control circuit 804 and does not input the FG signal 16 to the PLL control circuit 804 according to the selection signal. A CPU 100 also outputs the reference clock corresponding to the BD signal 21 to the PLL control circuit 804. This reference clock is a periodic signal having a period that is different from that of the reference clock corresponding to the FG signal 16 and that corresponds to the target rotation number of the polygon mirror 15a. The PLL control circuit 804 transmits an acceleration signal and a deceleration signal to the motor drive circuit 805 so that the period of the BD signal 21 input to the PLL control circuit 804 matches the period of the reference clock corresponding to the BD signal.

When the drive motor 700 is activated from the stopped state, the image forming apparatus 1 performs rotation control of the drive motor 700 based on the detection result of the period of the FG signal 16, and when the rotation number reaches close to the target rotation number, switches to rotation control of the drive motor 700 based on the detection result of the period of the BD signal 21. The image forming apparatus 1 forms an image based on the image data in a state where the rotation control of the drive motor 700 based on the detection result of the period of the BD signal is performed.

When the polygon mirror 15a is stopped, the BD signal 21 is not generated. Therefore, the image forming apparatus 1 performs feedback control of the drive motor 700 using the FG signal 16 for the control from the activation of the polygon mirror 15a to the time when the rotation speed reaches close to the target rotation speed.

On the other hand, the FG signal 16 is generated based on the output of the hall element 701, but the output of the hall element 701 includes high frequency noise. On the other hand, the output of the BD sensor 20, which is a light-sensitive element, has less noise than the output of the hall element 701. As a result, the period of the BD signal 21 has a smaller variation than the period of the FG signal 16. Therefore, the image forming apparatus 1 switches the rotation control of the drive motor 700 from feedback control using the FG signal 16 to feedback control using the BD signal 21 before starting to form an image, and during image formation, the image forming apparatus 1 performs the feedback control on the drive motor 700 using the BD signal 21.

Figure 9:
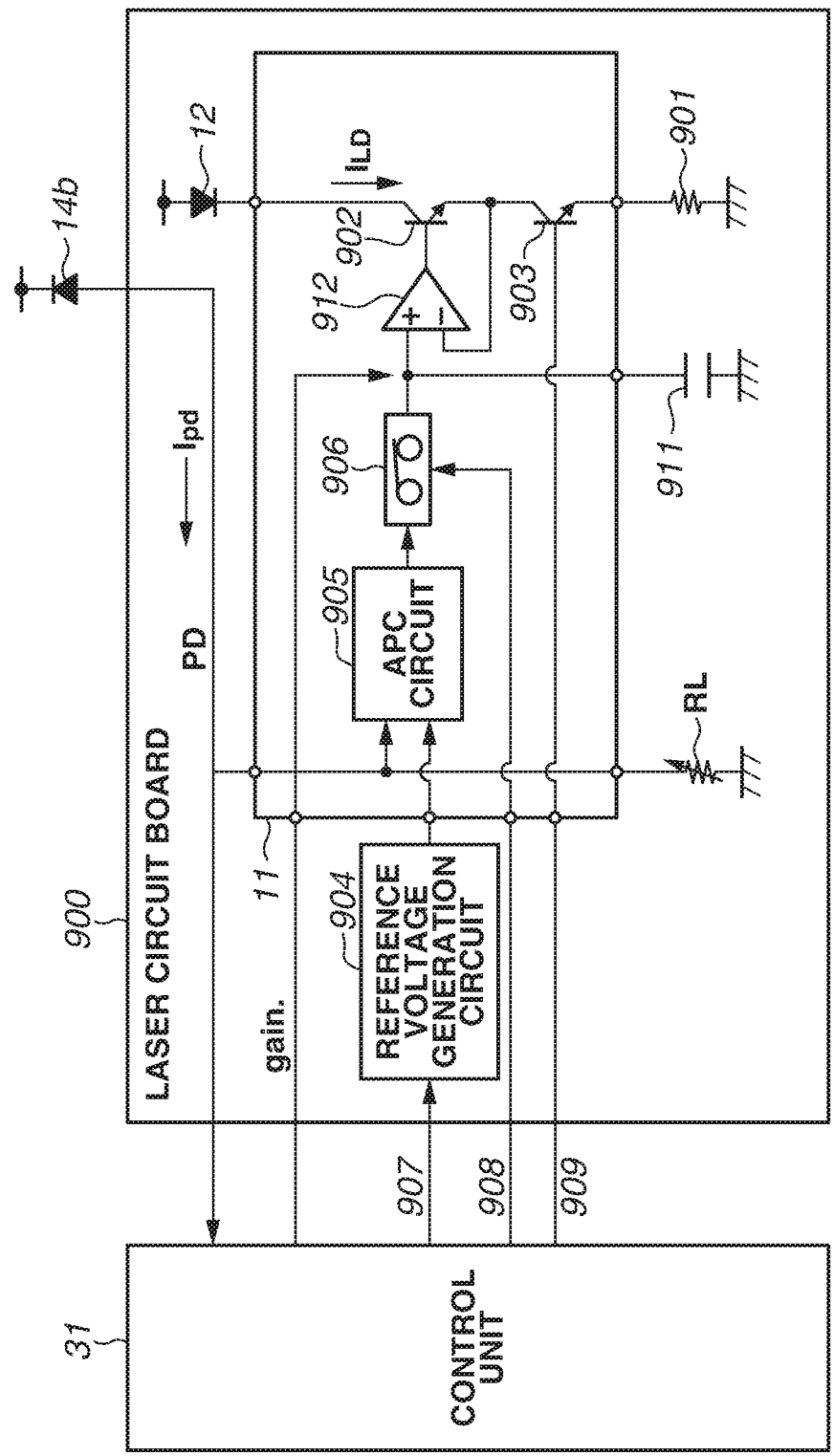
FIG. 9 is a control block diagram of a semiconductor laser

FIG. 9 is a control block diagram for controlling the semiconductor laser 12 of the image forming apparatus 1. A laser driver 11 (light amount control unit), a reference voltage generating circuit 904, a resistor RL, a capacitor 911, a resistor 901, and a semiconductor laser 12 are mounted on a laser circuit board 900 (not illustrated) included in the optical scanning device 2. The laser drive board 900 is connected to the control unit 31 by a cable.

The semiconductor laser 12 emits a laser beam having an amount of light corresponding to the value of the current ILD supplied from the laser driver 11. The PD 14b (first light-sensitive element) outputs current Ipd having a value corresponding to the amount of received light. The current Ipd is converted to a voltage Vpd by the resistor RL. The voltage Vpd is input to the laser driver 11 and the control unit 31. The PD 14b and the resistor RL function as a detection unit to detect the amount of light of the laser beam.

The laser driver 11 includes an APC circuit 905 (voltage control circuit), a switch 906, a comparator 912, a transistor 902, and a transistor 903, and supplies current ILD to the semiconductor laser 12. A pulse width modulation (PWM) signal 909 is input from the control unit 5 to the laser driver 11. The PWM signal 909 is a signal for turning ON/OFF the transistor 903. For example, when the PWM signal 909 is at a high level, current ILD flows through the semiconductor laser 12. The semiconductor laser 12 emits a laser beam having an amount of light corresponding to the value of the current ILD. On the other hand, when the PWM signal 909 is at a low level, the current ILD does not flow through the semiconductor laser 12.

The value of the current ILD is determined according to the voltage of the capacitor 911 and the resistance value of the resistor 901. An anode terminal of the resistor 901 is connected to an emitter terminal of the transistor 903. A cathode terminal of the resistor 901 is grounded. A collector terminal of the transistor 903 is connected to an emitter terminal of the transistor 902. A base terminal of the transistor 902 is connected to an output terminal of the comparator 912.

The voltage V− of the inverting terminal of the comparator 912 is determined by the value of the current ILD and the resistor 901. The comparator 912 controls the base voltage of the transistor 902 based on the comparison result between the voltage V+ of the non-inverting terminal and V− of the inverting terminal. In other words, the base voltage of the transistor 903 is controlled to be a voltage corresponding to the voltage of the capacitor 911. By controlling the base voltage of the transistor 902 in this way, the voltage of the anode terminal of the resistor 901 is controlled. As a result, the value of the current ILD is controlled.

Next, automatic power control (APC) will be described. The APC is performed to control the amount of light of the laser beam emitted from the semiconductor laser 12 to be a target amount of light. In other words, the APC in the image forming apparatus 1 of the present exemplary embodiment is to control the voltage of the capacitor 911 to a voltage corresponding to the target amount of light of the laser beam. The image forming apparatus 1 controls the amount of light of a laser beam that scans over the photosensitive drum 25 according to environmental conditions and the state of the image forming apparatus (e.g., sensitivity of the photosensitive drum). On the other hand, the image forming apparatus 1 controls the amount of light that is incident on the BD sensor 20 to be constant irrespective of environmental conditions and the state of the image forming apparatus. The image forming apparatus 1 according to the present exemplary embodiment performs feedback control of the current by the APC so that the amount of light that is incident on the BD sensor 20 becomes the target amount of light, and releases the feedback loop of the APC in a period during which the laser beam scans over the photosensitive drum 25. The feedback loop of the APC is formed by the control unit 31 turning ON the switch 906, and is released by the control unit 31 turning OFF the switch 906. Based on the generation timing of the BD signal 21, the control unit 31 turns ON the switch 906 in a period during which the laser beam does not scan the photosensitive drum 25, thereby forming a feedback loop. Based on the generation timing of the BD signal 21, the control unit 31 turns OFF the switch 906 in the period during which the laser beam scans the photosensitive drum 25.

The control unit 31 transmits a voltage instruction signal indicating the target voltage value to the reference voltage generating circuit 904. The reference voltage generating circuit 904 inputs a reference voltage Vref1 to the APC circuit 905 based on the voltage instruction signal. The reference voltage Vref1 is a voltage corresponding to the target amount of light of the laser beam that is incident on the BD sensor 20, and is, for example, a voltage corresponding to 200 [μW] to be described below.

The control unit 31 sets the PWM signal 909 to the high level when performing the APC. As a result, the current ILD having a value corresponding to the voltage Vch of the capacitor 911 flows through the semiconductor laser 12. The semiconductor laser 12 emits a laser beam having an amount of light corresponding to the value of the current ILD. By receiving the laser beam, the PD 14b outputs the current Ipd (light reception signal) having a value corresponding to the amount of the laser beam. The PD 14b is connected to the control unit 31, the resistor RL, and the APC circuit 905. The current Ipd flows to the ground via the resistor RL. The voltage Vpd of the anode of the resistor RL is determined by the current Ipd and the resistance value of the resistance RL. In other words, the PD 14b outputs the current Ipd, whereby the voltage Vpd is generated. The voltage Vpd is input to the control unit 31 and the APC circuit 905.

The APC circuit 905 includes a comparator (not illustrated) configured to compare the reference voltage Vref1 and the voltage Vpd. The APC circuit 905 controls the voltage of the capacitor 911 based on the comparison result between the reference voltage Vref1 and the voltage Vpd. More specifically, in the case where the reference voltage Vref1>the voltage Vpd is satisfied, the APC circuit 905 charges the capacitor 911 so that the voltage of the capacitor 911 increases. On the other hand, in the case where the reference voltage Vref1<the voltage Vpd is satisfied, the APC circuit 905 discharges electric charge from the capacitor 911 so that the voltage of the capacitor 911 decreases. In the case where the reference voltage Vref1=the voltage Vpd is satisfied, the APC circuit 905 maintains the voltage of the capacitor 911.

Upon completion of the APC, the control unit 31 releases the connection of the switch 906 by a sample-and-hold signal. By releasing the switch 906, the voltage of the capacitor 911 is held.

The control unit 31 inputs a gain signal (gain) to the laser driver 11. In each scanning cycle of the laser beam, the control unit 31 inputs a signal having 100% gain signal to the laser driver 11 just before the laser beam scans the BD sensor 20. On the other hand, in each scanning cycle of the laser beam, the control unit 31 outputs, to the laser driver 11, a signal having arbitrary gain of less than 100% from the time just before the laser beam scans the photosensitive drum 25 until the laser beam finishes the scanning of the photosensitive drum 25. The signal having arbitrary gain is controlled by the control unit 31 based on the detection result of a toner pattern for detecting density and the detection result of environmental conditions including temperature and humidity.

Figure 3A:
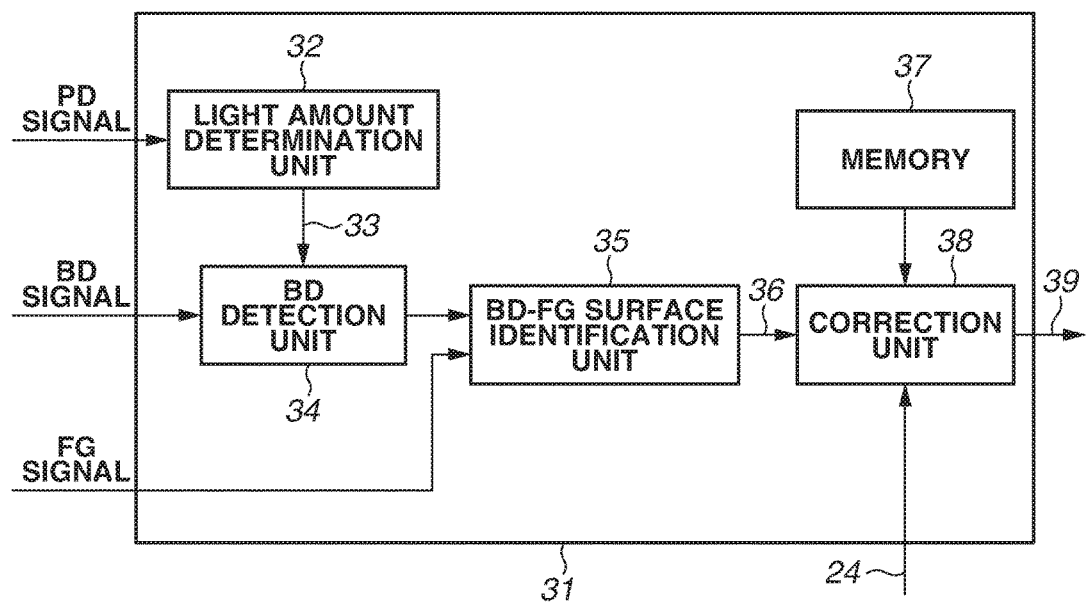
FIG. 3A is an internal block diagram of a control unit according to a first exemplary embodiment.
Figure 3B:
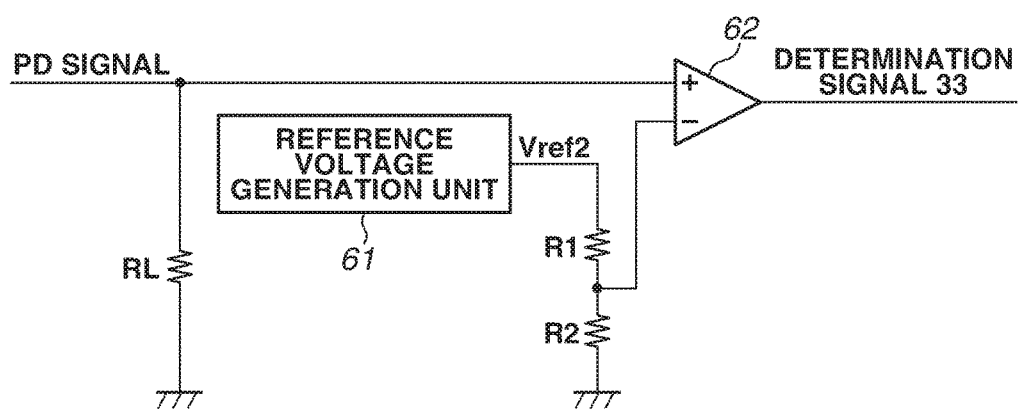
FIG. 3B is an internal block diagram of a light amount determination unit provided inside the control unit according to the first exemplary embodiment.

FIG. 3A is a block diagram illustrating an internal configuration of the control unit 31 according to the first exemplary embodiment. FIG. 3B is a block diagram illustrating an internal configuration of a light amount determination unit 32 of the control unit 31 according to the first exemplary embodiment.

The control unit 31 includes the light amount determination unit 32, a BD detection unit 34, a BD-FG surface identification unit 35, a memory 37, and a correction unit 38. The light amount determination unit 32 detects the PD signal 14c. The light amount determination unit 32 determines whether the voltage of the PD signal 14c is lower than the threshold voltage corresponding to the target amount of light. When the voltage of the PD signal 14c is lower than the threshold voltage corresponding to the target amount of light, the light amount determination unit 32 outputs a determination signal 33 at a low level to the BD detection unit 34. When the voltage of the PD signal 14c is equal to or higher than the threshold voltage corresponding to the target amount of light, the light amount determination unit 32 outputs the determination signal 33 at a high level to the BD detection unit 34.

As illustrated in FIG. 3B, the light amount determination unit 32 includes a reference voltage generation unit 61, voltage dividing resistors R1 and R2, and a comparator 62. The voltage Vpd is input to the non-inverting terminal of the comparator 62. The reference voltage generation unit 61 outputs a reference voltage Vref2. The reference voltage Vref1 and the reference voltage Vref2 may be a same voltage or different voltages. The reference voltage Vref2 is divided by the voltage dividing resistor R1 and the voltage dividing resistor R2, and the voltage Vdiv obtained by the division is input to the inverting terminal of the comparator 62.

Vdiv corresponds to a threshold voltage to be described below. The reference voltage Vref2, the voltage dividing resistor R1, and the voltage dividing resistor R2 are set to satisfy the relation Vdiv<Vref1. The reference voltage Vref1 and the reference voltage Vref2 may be a same voltage or different voltages. The voltage dividing resistor R1 and the voltage dividing resistor R2 respectively have fixed values.

The comparator 62 compares the PD voltage Vpd with the threshold voltage Vdiv. The comparator 62 outputs the determination signal 33 at the low level when Vpd<Vdiv is satisfied. The comparator 62 outputs the determination signal 33 at the high level when Vpd Vdiv is satisfied.

While the light amount determination unit 32 outputs the determination signal 33 at the low level, the BD detection unit 34 does not input the BD signal 21 to the BD-FG surface identification unit 35. Therefore, the BD-FG surface identification unit 35 cannot perform surface identification based on the phase relationship between the BD signal 21 and the FG signal 16. On the other hand, when the light amount determination unit 32 switches the determination signal 33 from the low level to the high level, the BD detection unit 34 inputs the BD signal to the BD-FG surface identification unit 35. The BD-FG surface identification unit 35 performs surface identification based on the phase relationship between the BD signal 21 and the FG signal 16 input from the BD detection unit 34. The BD-FG surface identification unit 35 inputs the surface identification result to the correction unit 38.

Next, a method for setting the threshold voltage Vdiv will be described. FIG. 4A illustrates a relationship between an amount of light that is incident on a certain light-sensitive element used as the BD sensor 20 and an output delay time of the BD signal 21. FIG. 4B illustrates a relationship between the amount of light that is incident on the BD sensor 20 having a same characteristic as that of FIG. 4A and an amount of light that is incident on a PD 14, which is a light-sensitive element different from the BD sensor.

The BD sensor 20 used in the image forming apparatus 1 according to the present exemplary embodiment has an output delay time that varies depending on the amount of light that is incident on the BD sensor 20. The output delay time is a time period from the reception of a laser beam until the rise of the analog waveform of the BD signal 21. As illustrated in FIG. 4A, the BD sensor 20 shows a characteristic that when the amount of incident light is less than 175 [μW], the change (inclination) in the output delay time with respect to the change in the amount of incident light increases. In addition, the BD sensor 20 shows a characteristic that the change in the output delay time with respect to the change in the amount of incident light decreases when the amount of incident light is 175 [μW] or more. In other words, the output delay time of the BD sensor 20 becomes stable at about 10 [ns] when the amount of incident light is 175 [μW] or more.

Although the variation of the amount of light that is incident on the BD sensor 20 is suppressed in a hold period other than the period during which the APC is executed, but the amount of light slightly varies. Accordingly, the period of the BD signal 21 generated with the amount of incident light less than 175 [μW] tends to vary. Thus, the period of the BD signal 21 generated by the BD sensor 20 that has received the laser beam of 175 [μW] or more varies less than the period of the BD signal generated by the BD sensor 20 that has received the laser beam of less than 175 [μW].

Therefore, the image forming apparatus 1 of the present exemplary embodiment is configured in such a manner that the surface identification processing using the period of the BD signal is performed when the amount of light that is incident on the BD sensor 20 is 175 [μW] or more, and the surface identification processing using the period of the BD signal is not performed when the amount of light that is incident on the BD sensor 20 is less than 175 [μW].

In order to make the amount of light that is incident on the BD sensor 20 175 [μW] or more, the amount of light that is incident on the PD 14 has to be 12.4 [μW] or more. Accordingly, in the image forming apparatus 1 according to the present exemplary embodiment, the amount of light of the laser beam having the minimum amount of light required for the surface identification processing is the amount of light 12.4 [μW] that is incident on the PD 14. The voltage corresponding to 12.4 μW is set as the threshold voltage. For example, when the target value of the amount of light that is incident on the BD sensor 20 is 200 [μW], the amount of light that is incident on the PD 14 is 14.4 [μW] as illustrated in FIG. 4B. The threshold value 12.4 [μW] corresponds to approximately 86% of the target amount of light 14.4 [μW] that is incident on the BD sensor 20. Therefore, as illustrated in FIG. 3B, the resistance values of the voltage dividing resistors R1 and R2 are determined from the threshold value (approximately 86%). In addition, the reference voltage Vref1 is a voltage indicating the 200 [μW] as described above. The amount of light corresponding to the threshold voltage is less than the target amount of light that is incident on the BD sensor 20.

Figure 5A:
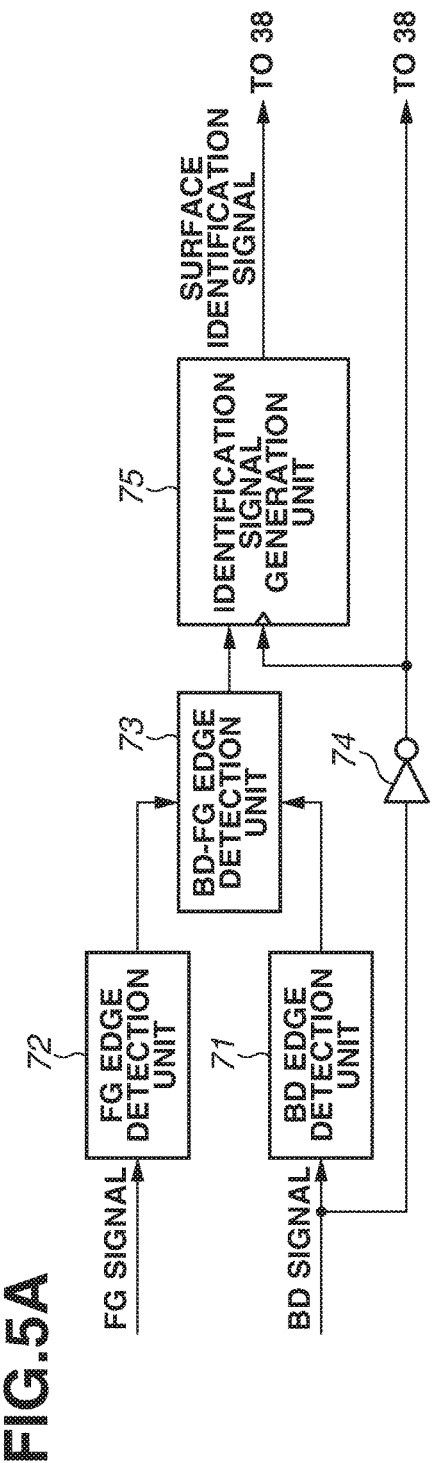
FIG. 5A is an internal block diagrams of a BD-FG surface identification unit provided inside the control unit.
Figure 5B:
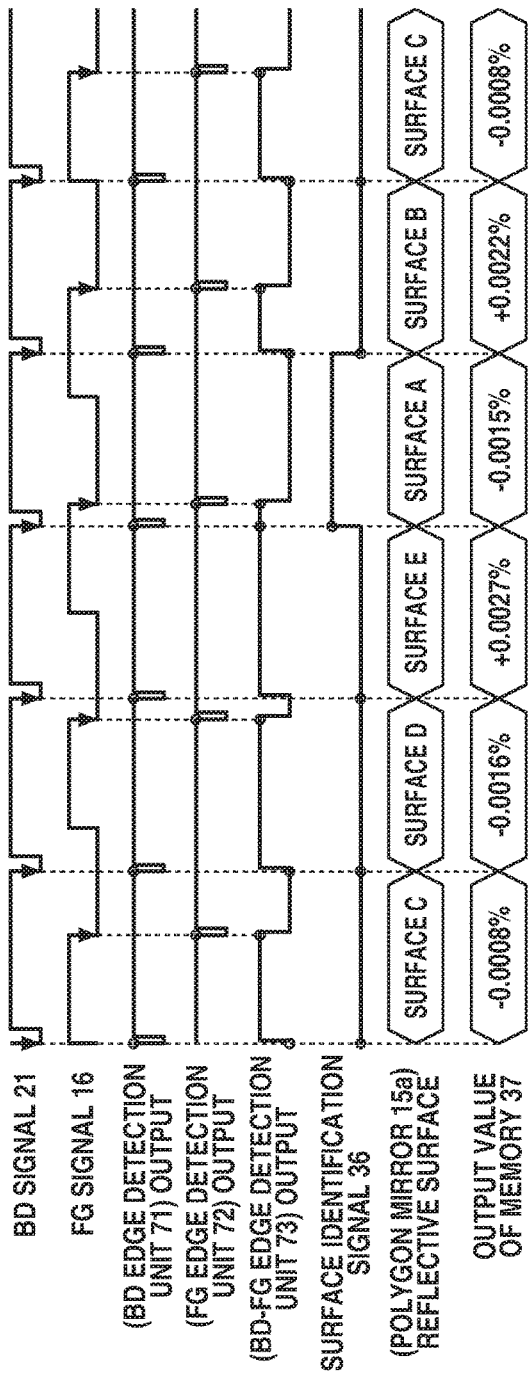
FIG. 5B is a timing chart illustrating surface identification operation of the BD-FG surface identification unit.

FIG. 5A is a block diagram illustrating a configuration of the BD-FG surface identification unit 35 included in the control unit 31. FIG. 5B is a timing chart illustrating the surface identifying operation of the BD-FG surface identification unit 35.

The BD signal 21 is input from the BD detection unit 34 to a BD edge detection unit 71. As illustrated in FIG. 5B, the BD edge detection unit 71 outputs a BD edge signal including a pulse indicating the timing of generation of a falling edge of the BD signal. As illustrated in FIG. 5B, it is assumed that the BD edge signal is a low-active signal.

The FG signal 16 is input from the waveform generation circuit 802 to an FG edge detection unit 72. As illustrated in FIG. 5B, the FG edge detection unit 72 outputs an FG edge signal including a pulse indicating the timing of generation of a falling edge of the FG signal 16. As illustrated in FIG. 5B, it is assumed that the FG signal 16 is a low-active signal.

The BD edge signal is input from the BD edge detection unit 71 to a FG-BD edge detection unit 73, and the FG edge signal is input from the FG edge detection unit 72 to the FG-BD edge detection unit 73. As illustrated in FIG. 5B, the FG-BD edge detection unit 73 outputs a BD-FG edge detection signal that rises in response to falling of the BD edge signal and falls in response to falling of the FG signal 16.

The BD-FG edge detection signal and a /BD signal obtained by inverting the BD signal 21 by the inversion circuit 74 are input to an identification signal generation unit 75. The identification signal generation unit 75 compares the pulse width of the BD-FG edge detection signal and the period of the /BD signal. In the image forming apparatus according to the present exemplary embodiment, five BD signals 21 are generated and four FG signals 16 are generated during one rotation of the polygon mirror 15a. Therefore, there is one BD cycle in which the FG signal 16 is not generated during one rotation of the polygon mirror 15a. For example, as illustrated in FIG. 5B, no FG edge signal is generated between the BD edge signal generated by the surface E and the BD edge signal generated by the surface A out of the five reflective surfaces. Therefore, the pulse width of the BD-FG edge signal is longer than the pulse interval of the /BD signal. When the pulse interval of the BD-FG edge signal that has a pulse width>the pulse interval of the /BD signal is detected, the identification signal generation unit 75 changes a surface identification signal 36 from a low level to a high level. Then, in response to the input of the pulse of the next /BD signal, the identification signal generation unit 75 changes the surface identification signal 36 from the high level to the low level. The reflective surface to which the laser beam having been emitted from the semiconductor laser 12 is incident during the period when the surface identification signal 36 is at the high level is the surface A.

The surface identification signal 36 is input to the correction unit 38 illustrated in FIG. 3. The /BD signal is also input to the correction unit 38. The correction unit 38 includes a counter therein. The correction unit 38 resets the counter based on the surface identification signal 36 and increments the count value of the counter by 1 each time a pulse of the /BD signal is input. The correction unit 38 repeats the operation. Here, the surface identification (ID) "0" is assigned to the reflective surface A, the surface ID "1" is assigned to the reflective surface B, the surface ID "2" is assigned to the reflective surface C, the surface ID "3" is assigned to the reflective surface D, and the surface ID "4" is assigned to the reflective surface E of the polygon mirror 15a. Thus, based on the count value of the counter and the surface ID, the correction unit 38 can sequentially identify the reflective surfaces on which the laser beam emitted from the semiconductor laser 12 is incident. The method of surface identification is not limited thereto. For example, a surface on which the laser beam is incident may be identified based on phase differences between the BD signal and the FG signal 16 for the respective reflective surfaces as illustrated in FIGS. 11A and 11B.

The memory 37 stores pieces of correction data separately set for the surface IDs of the respective reflective surfaces of the polygon mirror 15a. The memory according to the present exemplary embodiment stores pieces of magnification correction data separately set for the respective surfaces. For example, the reduction magnification data of −0.0015% is assigned to the surface ID "0", the enlargement magnification data of +0.0022% is assigned to the surface ID "1", the reduction magnification data of −0.0008% is assigned to the surface ID "2", the enlargement magnification data of +0.0016% is assigned to the surface ID "3", and the reduction magnification data of +0.0027% is assigned to the surface ID "4". The correction unit 38 sets the correction data for the surface ID corresponding to the count value. Then, the correction unit 38 corrects the input image based on the set correction data. As described above, the reflective surface on which the laser beam is incident is identified, and correction data is switched based on the identification result, whereby magnification correction in the main scanning direction according to the reflective surface can be performed.

A problem of the surface identification processing will be now described. As described above, when assembling the polygon mirror 15a to the rotor 702 of the drive motor 700, a worker does not identify the relative positional relationship between the magnetization pattern of the permanent magnet 703 and the plurality of reflective surfaces of the polygon mirror 15a. Therefore, many assembled optical scanning devices may include devices that generate signals having a very close phase relationship between falling of the BD signal 21 and falling of the FG signal. FIG. 12 illustrates that falling of the FG signal is generated close to the falling of BDn. In such an optical scanning device, the output delay of the BD sensor 20 causes an error in the surface identification result by the control unit 31.

Therefore, the image forming apparatus 1 according to the present exemplary embodiment is configured in such a manner that the surface identification processing using the period of the BD signal is performed when the amount of light that is incident on the BD sensor 20 is 175 [μW] or more, and the surface identification processing using the period of the BD signal is not performed when the amount of light that is incident on the BD sensor 20 is less than 175 [μW].

When an image forming job is input in the standby state of the image forming apparatus 1, the control unit 31 and the laser driver 11 perform activation control. The control unit 31 performs the activation control of the polygon mirror 15a and causes the laser driver 11 to perform activation control (initial APC) of the semiconductor laser 12. In addition, the control unit 31 performs the above-described surface identification processing using the BD signal 21 and the FG signal 16 generated by the activation control of the image forming apparatus 1.

The initial APC performed by the laser driver 11 is started in a state where the rotation speed of the polygon mirror 15a is controlled to be close to the target rotation speed based on the period of the FG signal 16. The laser driver 11 gradually increases the current supplied to the semiconductor laser 12 and holds the current value when the amount of light reaches the target amount of light. While the current supplied to the semiconductor laser 12 is being gradually increased, the laser beam is incident on the BD sensor 20. Since the amount of incident light of the laser beam at this time is less than 175 [μW], the output delay time of the BD signal is large. When the surface identification processing is performed with the amount of incident light having large output delay time, BDn is generated immediately after the falling of the FG signal due to the large output delay time although the BDn illustrated in FIG. 12 should be generated just before the falling of the FG signal. As described above, when the surface identification processing is performed when the BD signal has a large output delay, the control unit 31 cannot perform the accurate surface identification.

Therefore, when the voltage of the PD signal reaches a value equal to or higher than the threshold voltage, the light amount determination unit 32 of the image forming apparatus according to the present exemplary embodiment allows input of the BD signal from the BD detection unit 34 to the BD-FG surface identification unit 35. The BD-FG surface identification unit 35 performs the surface identification processing when the BD signal is input from the BD detection unit 34, and does not perform the surface identification processing when the BD signal is not input.

FIG. 7 is a timing chart at activation of the polygon mirror 15a. In FIG. 7, when an image forming job is input to the image forming apparatus 1, the control unit forms a feedback control loop of the drive motor 700 using the period of the FG signal 16. By forming this feedback loop, the PLL control circuit 804 transmits an acceleration signal to the motor drive circuit so that the period of the FG signal 16 becomes the period of the reference clock for the FG signal. In response to the acceleration signal, the motor drive circuit 805 controls current supplied to the drive motor 700. As the current is supplied to the coils 706, the drive motor 700 starts to rotate. The FG signal 16 is generated by the rotation of the drive motor 700. The control unit 31 controls the drive motor 700 so that the period of the FG signal 16 becomes the target period.

Figure 6:
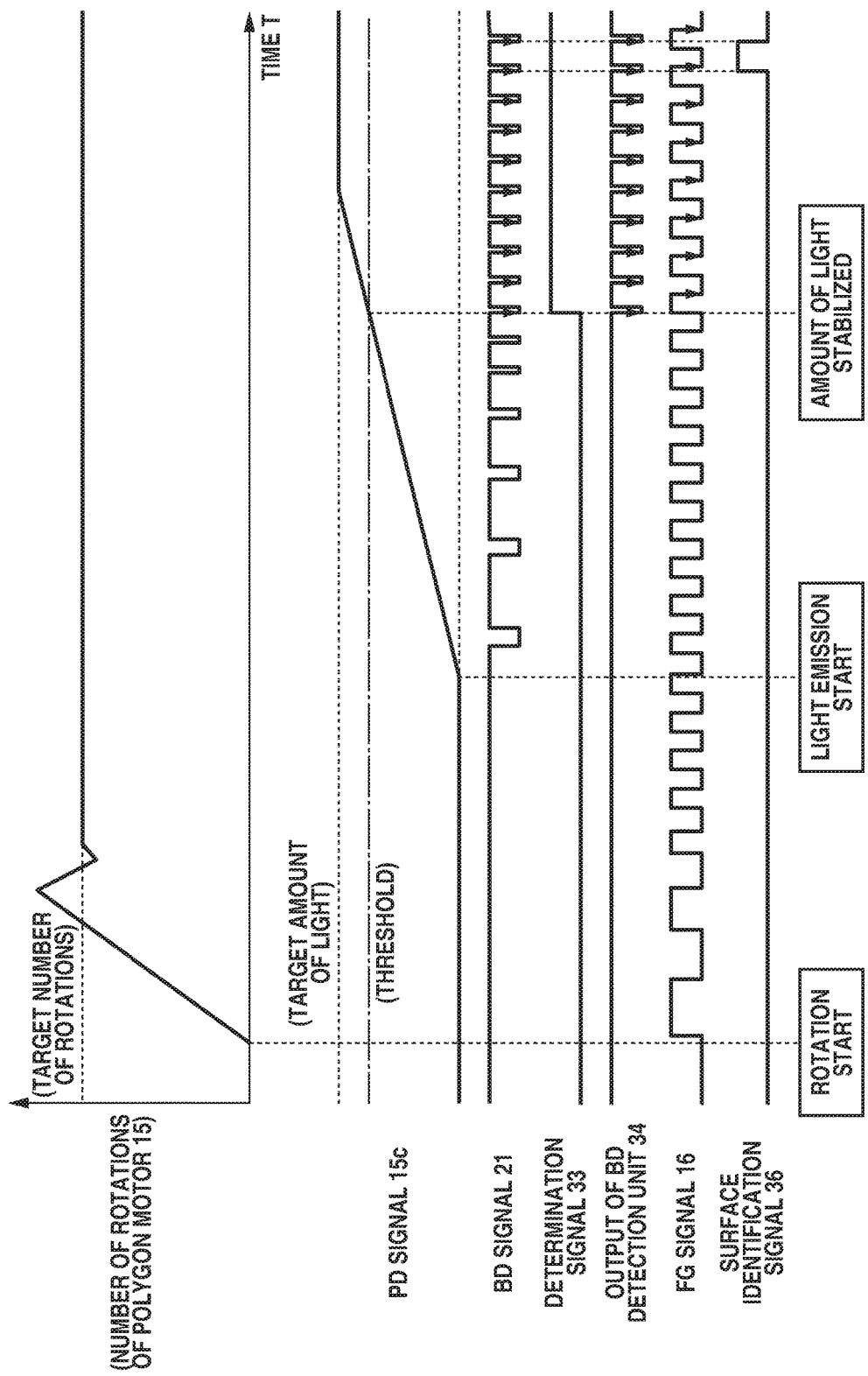
FIG. 6 is a time chart of identification processing at activation of a polygon mirror.

In a state where the drive motor 700 rotates at about the target rotation number, the control unit 31 causes the laser driver 11 to perform the APC ("LIGHT EMISSION START" in FIG. 6). By the laser driver 11 performing the APC, the voltage of the capacitor 911 is gradually charged, and accordingly the voltage Vpd of the PD signal 15c exceeds the threshold voltage Vdiv as illustrated in FIG. 6. When the voltage Vpd reaches a value satisfying the voltage Vpd the voltage Vdiv, the light amount determination unit 32 switches the determination signal 33 from the low level to the high level. The switching of the determination signal 33 to the high level causes the BD signal to be input from the BD detection unit 34 to the BD-FG surface identification unit 35. The BD-FG surface identification unit 36 performs the surface identification in response to the input of the BD signal, and outputs the surface identification signal 36 as a result of the surface identification.

When the surface identification is performed using output of the BD detection unit 34 as illustrated in FIG. 7, the output timing of the BD signal 21 and the output timing of the FG signal 16 are uniquely determined by the optical arrangement and the structure of the drive motor 700. Therefore, the surface identification signal 36 can be obtained without depending on the rotation number of the polygon motor 15.

As described above, the surface identification processing is performed using the period of the BD signal when the amount of light that is incident on the BD sensor 20 reaches an amount equal to or more than the threshold value, and the surface identification processing is not performed using the period of the BD signal in a state where the amount of light that is incident on the BD sensor is less than the threshold value. Therefore, malfunction of the image forming apparatus due to failure of the surface identification processing can be suppressed.

According to an exemplary embodiment of the present invention, when the voltage output from the detection unit by receiving the light beam is equal to or higher than the predetermined threshold voltage, the reflective surface identification processing is performed, and when the voltage output from the detection unit is lower than the predetermined threshold voltage, the identification processing is not performed. As a result, failure of the surface identification processing due to output delay of the second light-sensitive element can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-138750, filed Jul. 13, 2016, which is hereby incorporated by reference herein in its entirety.

What is claimed is:

1. An image forming apparatus comprising:
  a light source configured to emit a light beam having an amount of light corresponding to a value of supplied current;
  a detection unit including a first light-sensitive element on which a light beam emitted from the light source is incident and configured to output a voltage corresponding to an amount of light that is incident on the first light-sensitive element;
  a rotating polygon mirror including a plurality of reflecting surfaces and configured to deflect a light beam emitted from the light source by the plurality of reflecting surfaces so that the light beam emitted from the light source scans over a photosensitive member;
  a second light-sensitive element configured to generate a periodic signal having a period corresponding to a rotation speed of the rotating polygon mirror by incidence of the light beam obtained by deflection by each reflective surface;
  a light amount control unit configured to control a value of current to be supplied to the light source based on the voltage output from the detection unit so that an amount of light of a light beam that is incident on the second light-sensitive element becomes a target amount of light;
  a voltage output unit configured to output a predetermined threshold voltage corresponding to an amount of light lower than the target amount of light; and
  an identification unit configured to perform identification processing for identifying a reflecting surface on which the light beam is incident from the plurality of reflecting surfaces using the period of the periodic signal,
  wherein the identification unit performs the identification processing when the voltage output from the detection unit is equal to or higher than the predetermined threshold voltage and does not perform the identification processing when the voltage output by the detection unit is lower than the predetermined threshold voltage.

2. The image forming apparatus according to claim 1, further comprising:

a storage unit configured to store pieces of correction data that are separately set corresponding to the respective reflective surfaces and that are for correcting drive conditions for driving the light source according to the reflective surfaces; and a control unit configured to control the light source according to control conditions respectively corresponding to the reflecting surfaces based on the identification result obtained by the identification processing and the correction data stored by the storage unit.

3. The image forming apparatus according to claim 2, wherein the correction data is magnification correction data for correcting magnification of an image in a scanning direction of the light beam, and wherein the control unit includes a correction unit configured to correct image data corresponding to the respective reflective surfaces based on the corresponding pieces of correction data based on the result of the identification processing.

4. The image forming apparatus according to claim 1, further comprising:

a drive motor including a rotor configured to rotate the rotating polygon mirror and a permanent magnet fixed to the rotor;

a circuit board on which the drive motor is mounted; and a hall element mounted on the circuit board, configured to detect change in magnetic flux caused by rotation of the rotor of the drive motor, and output a hall element signal based on the detection result, wherein the identification unit performs the identification processing based on a phase relationship between the hall element signal and the periodic signal.

5. The image forming apparatus according to claim 4, wherein the permanent magnet is magnetized to have S poles and N poles alternately along a rotation direction of the rotating polygon mirror.

6. The image forming apparatus according to claim 1, wherein the light amount control unit includes a capacitor that determines a value of current to be supplied to the light source and a reference voltage generation unit and configured to generates a reference voltage corresponding to the target amount of light, wherein the light amount control unit controls voltage of the capacitor based on a result of comparing a voltage corresponding to the amount of light that is incident on the first light-sensitive element with the reference voltage, wherein the light amount control unit increases an amount of light of the light beam input to the second light-sensitive element to the target amount of light by charging the capacitor when an image forming job is input, and wherein by a time when the amount of light of the light beam input to the second light-sensitive element increases to the target amount of light, a voltage output from the second light-sensitive element exceeds the threshold voltage.

7. An image forming apparatus comprising:

a light source configured to emit a light beam having an amount of light corresponding to a value of supplied current;

a detection unit including a first light-sensitive element on which a light beam emitted from the light source is incident and configured to output a voltage corresponding to an amount of light that is incident on the first light-sensitive element;

a rotating polygon mirror including a plurality of reflecting surfaces and configured to deflect the light beam emitted from the light source by the plurality of reflecting surfaces so that the light beam emitted from the light source scans over a photosensitive member;

a deflection device including a drive motor including a rotor configured to rotate the polygon mirror and a permanent magnet fixed to the rotor, a circuit board on which the drive motor is mounted, and a hall element mounted on the circuit board, configured to detect change in magnetic flux caused by rotation of the rotor of the drive motor, and output a hall element signal based on the detection result;

a second light-sensitive element configured to generate a periodic signal having a period corresponding to a rotation speed of the rotating polygon mirror by incidence of light beams obtained by deflection by the respective reflective surfaces;

a light amount control unit configured to control a value of current to be supplied to the light source based on the voltage output by the detection unit so that an amount of light of a light beam that is incident on the second light-sensitive element becomes a target amount of light;

a voltage output unit configured to output a predetermined threshold voltage corresponding to an amount of light lower than the target amount of light; and an identification unit configured to perform identification processing for identifying a reflecting surface on which the light beam is incident from the plurality of reflecting surfaces using the period of the periodic signal, wherein the identification unit performs the identification processing when the voltage output from the detection unit is equal to or higher than the predetermined threshold voltage, and does not perform the identification processing when the voltage output by the detection unit is lower than the predetermined threshold voltage.

8. The image forming apparatus according to claim 7 further comprising:

a storage unit configured to store correction data separately set corresponding to the respective reflective surfaces and for correcting drive conditions for driving the light source according to the reflective surfaces; and a control unit configured to control the light source according to the control conditions respectively corresponding to the reflecting surfaces based on the identification result obtained by the identification processing and the correction data stored by the storage unit.

9. The image forming apparatus according to claim 8, wherein the correction data is magnification correction data for correcting magnification of an image in a scanning direction of the light beam, and wherein the control unit includes a correction unit configured to correct image data respectively corresponding to the reflective surfaces based on the corresponding correction data based on the result of the identification processing.

10. The image forming apparatus according to claim 8, wherein the permanent magnet is magnetized to have S poles and N poles alternately along a rotation direction of the rotating polygon mirror, and wherein a period of the hall element signal and the period of the periodic signal while the polygon mirror makes one rotation are different from each other.

\* \* \* \* \*